United States Patent [19]

Erzinger

[11] 4,452,608
[45] Jun. 5, 1984

[54] PROCESS FOR THE PREPARATION OF METAL COMPLEX DYE FORMULATIONS USING MEMBRANE SEPARATION

[75] Inventor: Paul Erzinger, Liestal, Switzerland

[73] Assignee: Ciba-Geigy Corporation, Ardsley, N.Y.

[21] Appl. No.: 469,494

[22] Filed: Feb. 24, 1983

[30] Foreign Application Priority Data

Mar. 5, 1982 [CH] Switzerland .......................... 1359/82

[51] Int. Cl.³ ............................................. C09B 67/54
[52] U.S. Cl. .......................................... 8/524; 8/527; 8/684; 8/917; 8/924
[58] Field of Search ............................. 8/685, 527, 524

[56] References Cited

U.S. PATENT DOCUMENTS 4,329,145 5/1982 Koll et al. ................................ 8/527

FOREIGN PATENT DOCUMENTS 37382 10/1981 European Pat. Off. .
59782 9/1982 European Pat. Off. .

Primary Examiner—A. Lionel Clingman
Attorney, Agent, or Firm—Edward McC. Roberts

[57] ABSTRACT

The invention describes a process for the preparation of formulations of metal complex dyes by means of a membrane separation process, which process comprises adding an anionic surfactant to the hot synthesis solution of over 50° C. of the metal complex dye before, during or after the final step of the synthesis, and cooling the solution to a temperature not lower than 20° C. before the membrane separation process.

The formulations so obtained are suitable for the preparation of dyebaths, padding liquors or printing pastes which may be used in particular for dyeing and printing textile material made of natural and synthetic polyamide.

15 Claims, No Drawings

PROCESS FOR THE PREPARATION OF METAL COMPLEX DYE FORMULATIONS USING MEMBRANE SEPARATION

The present invention relates to a process for the preparation of formulations of metal complex dyes.

It is known to convert the dilute salt-containing dye solutions or dispersions obtained at the conclusion of dye synthesis, or by dissolving or suspending dye filter cakes, into concentrated formulations by means of a membrane separation process while simultaneously removing salts therefrom. Such a process for preparing concentrated dye formulations is described e.g. in German Offenlegungsschrift No. 22 04 725.

Although membrane separation methods are easy to carry out and enable salts to be substantially removed from dye solutions or dispersions, they nevertheless have drawbacks. A principal problem is membrane clogging, which results in unacceptably long filtration times. Such clogging is caused by dye microparticles which settle in the pores of the membrane and so make the membrane impermeable.

To avoid such filtration problems, the proposal is made in European patent application No. 00 37 382 to add a surfactant to the cold solution or dispersion to be concentrated. However, the addition of surfactants alone to the cold synthesis solution of metal complex dyes has not proved sufficient. Up to now a pregrinding has been necessary before concentrating by means of the membrane separation process.

It is the object of the present invention to avoid this pregrinding, i.e. to work up metal complex dyes so as to obtain a synthesis solution which can be concentrated direct by means of a membrane separation process without the necessity of a pregrinding procedure and while simultaneously avoiding filtration problems caused by the deposits of dye microparticles.

This object is accomplished by adding an anionic surfactant, before, during or after the last step of the synthesis of the metal complex dye, to the hot synthesis solution of over 50° C. and cooling it to a temperature of not lower than 20° C. before carrying out the membrane separation process.

The addition of an anionic surfactant to the hot synthesis solution causes the metal complex dye to remain completely or almost completely in solution as the solution cools, or to precipitate in crystalline form in a particle size which does not result in the membrane becoming clogged.

The synthesis solution can be cooled indirectly or directly to a temperature not lower than 20° C. The solution may be cooled indirectly by using e.g. a cooling loop which is hung into the reactor, whereas direct cooling is effected by diluting the synthesis solution with cold water. It is advantageous to stir the synthesis solution in order to avoid temperature fluctuations during cooling.

Examples of suitable anionic surfactants are: condensation products of aromatic sulfonic acids with formaldehyde, such as condensation products of formaldehyde, naphthalenesulfonic acid and benzenesulfonic acid, or a condensation product of crude cresol, formaldehyde and naphthalenesulfonic acid, as well as condensation products of phenolsulfonic acid, cresolsulfonic acid or naphtholsulfonic acid and formaldehyde, or also lignosulfonates (sulfite cellulose lye) or oxylignosulfonates. Preferred anionic surfactants are condensation products of formaldehyde and aromatic sulfonic acid, condensation products of crude cresol, formaldehyde and naphthalenesulfonic acid; lignosulfonates and oxylignosulfonates; and, in particular, condensates of formaldehyde and naphthalenesulfonic acids.

Single anionic surfactants or also mixtures of two or more anionic surfactants may be added to the synthesis solution, preferably in a concentration of 5 to 30% by weight, based on the dry weight of the dye.

During the addition of the anionic surfactant, the synthesis solution preferably has a temperature in the range from 70° to 150° C.—at temperatures above 100° C. the process is carried out under pressure—and preferably from 80° to 95° C.

It is advantageous to add the anionic surfactant after the last step of the synthesis. The last step is e.g. either metallising or, when preparing the 1:2 complexes, the reaction of the previously prepared 1:1 metal complex dye with the second metallisable component.

Suitable metal complex dyes are 1:1 or 1:2 metal complex dyes of azo or azomethine dyes, or also metallised phthalocyanines. Dyes of this kind contain e.g. a nickel, cobalt, copper, chromium or iron ion as central metal ion. 1:2 Metal complex dyes are both symmetrical and assymetrical complexes. As chromophoric ligands there may be mentioned: o-carboxy-o'-hydroxy dyes, o-hydroxy-o'-amino dyes or o,o'-dihydroxyazo dyes of the benzene-azobenzene, naphthalene-azonaphthalene, benzene-azonaphthalene, benzene-azopyrazolone, benzene-azopyridone or benzene-azoacetoacetamide type, which groups may be unsubstituted or substituted. Examples of possible substituents are: unsubstituted or substituted sulfamoyl, sulfo or nitro groups or halogen atoms. Preferred metal complex dyes are those which contain a sulfo group in the molecule.

With the process of this invention there also prepared preferably compositions of those 1:1 or 1:2 metal complex dyes which contain monoazo and/or disazo dyes as ligands and a chromium or cobalt ion as central metal ion.

The term "membrane separation process" will be understood as meaning hyperfiltration. In contradistinction to conventional filtration, in which solid particles are separated from a liquid, this separation process is a selective molecular separation method. The membrane acts as a molecular sieve and is able to retain dissolved substances, if the molecular size is sufficient, on the contact surface of the membrane. It is convenient to use membranes with a cut-off level having a retention of at least 90% when these are subjected to hyperfiltration for 20 to 30 minutes. Such membranes are those having a cut-off level in the molecular weight range of 300 to 800, preferably of 400 to 500, and which are symmetrical or asymmetrical. They permit water and dissolved substances whose molecular weight is below the cut-off level to pass through under low to medium pressure. In the process of this invention, pressures of 10 to 100 bar, preferably of 10 to 30 bar, are applied.

The synthesis solution conveniently has a temperature in the range from 30° to 40° C. during the membrane separation process. The hyperfiltration unit can be charged with the warm synthesis solution of about 30° C., which is then warmed to about 40° C. during the separation process by pumping it through the system.

The preferred membranes employed in the process of this invention consist substantially of a polymeric material. They are advantageously modified at their surface by radicals which carry ionisable groups.

The polymeric material is a natural, regenerated or synthetic material which contains e.g. hydroxyl, amino and/or amidoxime groups as reactive groups. Such materials can be reacted with suitable reagents which, on the one hand, contain ionisable groups and, on the other, at least one reactive group, to form a chemical (covalent) bond.

The following polymeric compounds, for example, may be modified in the indicated manner:

cellulose acetates, e.g. those having a low content of acetyl groups, but also higher acylated cellulose, e.g. 2½-acetate, or polyvinyl alcohols, or polyacrylonitrile and copolymers of acrylonitrile and other monomers having ethylenic unsaturation.

Suitable reactive reagents which contain an ionisable group are colourless and coloured compounds, e.g. ionic reactive dyes which may belong to different classes, such as anthraquinone, azo or formazane dyes. They may also be in the form of metal complexes.

Examples of suitable ionisable groups are sulfato groups, sulfonic acid groups, sulfamoyl groups, carboxylic acid groups, carbamoyl groups, hydroxyl, thiol, isocyanate and/or isothiocyanate groups, ammonium groups formed from primary, secondary or tertiary amino groups and hydrogen or quaternary ammonium groups, and also phosphonium or sulfonium groups. Reactive compounds (reactive dyes) containing sulfonic acid groups, carboxylic acid groups or ammonium groups, are preferred.

Those polymer membranes are particularly useful and versatile which are modified by an azo dye which contains sulfonic acid groups. The azo dye may also contain a complexed metal, e.g. copper. Such membranes are described e.g. in German Offenlegungsschrift specification Nos. 25 05 254 and 30 35 134 and in European patent application No. 26399.

The membranes employed in the process of this invention preferably have a pore diameter of 0.1 to 50 nm.

In a single passage through the membrane, the degree of purification and/or salt removal may be up to 70% and more, without noticeable loss of dye. Moreover, the volume of the solution of the retained substances (in the concentrate) decreases correspondingly and the concentration of the retained portion increases.

Before the membrane separation process, the synthesis solution preferably has a solids content of 5 to 15% by weight and concentration is effected until the solids content has risen to 30–50%.

The concentrated dyestuff solution or suspension of low salt content obtained after carrying out the membrane separation process, and which contains the metal complex dye and the anionic surfactant, can be converted by drying into a solid dye formulation, optionally after the addition of ingredients such as binders, dust inhibitors, solubilisers, dispersants and/or extenders. Less energy is required for drying owing to the increased dye concentration. Conventional drying machines are employed, in particular a spray drier or a paddle drying unit.

The concentrated dye solution or suspension of low salt content can also be processed direct to a storage stable liquid formulation. In this case it is then only necessary to adjust the dye solution or suspension to a specific final dye concentration by dilution and/or with the aid of extenders, optionally after the addition of ingredients conventionally employed for liquid formulations such as textile auxiliaries, foam inhibitors, antifreeze agents, humectants, dispersants and/or microbicides.

The addition of an anionic surfactant to the hot synthesis solution of the metal complex dye affords the following advantages in the process of this invention:

(a) the metal complex dye is obtained in finely dispersed form or remains in solution, whereby clogging of the membranes during the separation process is avoided, and (b) a preliminary and primary grinding of the dye is not required and the concentrated synthesis solution can be further processed direct to a solid or liquid dye formulation.

The metal complex dye formulation prepared according to this invention are used for the preparation of dyebaths, padding liquors or printing pastes. These are suitable in particular for dyeing or printing textile material made of natural and especially synthetic polyamide.

The invention is illustrated by the following Examples, in which parts and percentages are by weight. A solution will be understood as meaning an apparent solution in which the dye is present in microdisperse form.

EXAMPLE 1

To 1000 parts of the synthesis solution of the dye of the formula

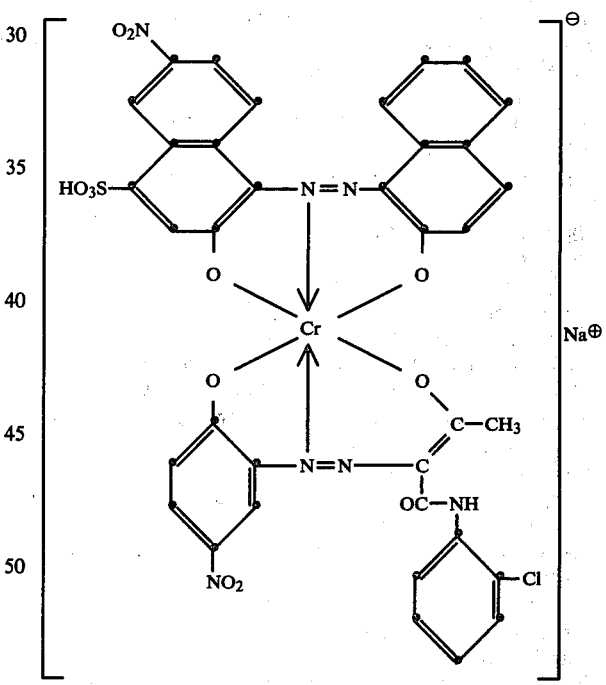

having a solids content of 11.2% are added 11 parts of a naphthalenesulfonic acid/formaldehyde condensation product at the conclusion of the synthesis and after metallisation. On addition of the anionic condensation product the synthesis solution has a temperature of 90° C. After addition of the surfactant the synthesis solution is allowed to cool to about 30° C., with stirring, to give a stable solution of the metal complex dye of the above formula. The solution is concentrated by hyperfiltration to a solids content of 34%. The degree of salt removal is 90%.

The concentrated dye solution is adjusted with sulfite lye to the desired final concentration of dye and subsequently dried in a spray drier to give a ready-for-use granular formulation.

EXAMPLE 2

To 1000 parts of the synthesis solution of the dye of the formula

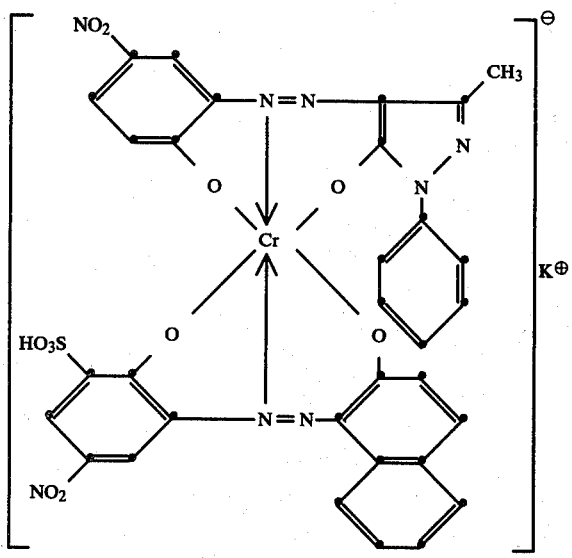

having a solids contant of 11.8% are added 12 parts of a naphthalenesulfonic acid/formaldehyde condensation product at the conclusion of the synthesis and after metallisation. On addition of the anionic condensation product, the synthesis solution has a temperature of 90° and is subsequently allowed to cool to about 30° C., with stirring, to give a stable dye solution which is concentrated by hyperfiltration to a solids content of 42%. The degree of salt removal is 90%.

The concentrated dye solution is adjusted with sulfite lye to the desired final concentration of dye and subsequently dried in a spray drier to give a ready-for-use granular formulation.

By repeating the above procedure, but not adding the anionic condensation product until after the synthesis solution has cooled, it is only possible to concentrate the dye solution to a maximum concentration of 30%. Microparticles of dye clog the membrane and make further concentration impossible.

EXAMPLE 3

43.9 parts of the 1:1 chromium complex of the dye obtained from diazotised 6-nitro-1-amino-2-naphthol-4-sulfonic acid and 2-naphthol, 37.6 parts of the dye obtained from diazotised 4-nitro-2-aminophenol and 2-chloroacetylacetanilide are stirred in 600 parts of hot water and the mixture is neutralised with sodium hydroxide. Stirring is then continued at 90° C. until both starting dyes are dissolved. To the solution of the resultant 1:2 complex are added 9 parts of a naphthalenesulfonic acid/formaldehyde condensation product and the solution is allowed to cool with stirring. The solution of the 1:2 chromium complex dye so obtained is finally concentrated by hyperfiltration to a solids content of 34%.

After addition of sulfite lye, ethylene glycol and a microbicide, the concentrated dye solution is adjusted to the desired final concentration of dye by dilution with water, to give a ready-for-use storage stable liquid formulation of the metal complex dye.

What is claimed is:

1. A process for the preparation of formulations of metal complex dyes by means of a membrane separation process, which process comprises adding an anionic surfactant to the hot synthesis solution of over 50° C. of the metal complex dye before, during or after the final step of the synthesis, and cooling the solution to about 30° C. immediately before the membrane separation process.

2. A process according to claim 1, wherein the anionic surfactant is a condensation product of formaldehyde and an aromatic sulfonic acid, a condensation product of crude cresol, formaldehyde and naphthalenesulfonic acid; or a lignosulfonate or an oxylignosulfonate.

3. A process according to claim 2, wherein the anionic surfactant is a condensation product of naphthalenesulfonic acid and formaldehyde.

4. A process according to claim 1, wherein the synthesis solution on addition of the surfactant has a temperature in the range from 70° to 150° C.

5. A process of claim 4, wherein the temperature is in the range of 80° to 95° C.

6. A process according to claim 1, wherein the anionic surfactant is employed in a concentration of 5 to 30% by weight, based on the dry weight of the metal complex dye.

7. A process according to claim 1 for the preparation of formulations of 1:1 or 1:2 metal complex dyes which contain monoazo and/or disazo dyes as ligands and a chromium or cobalt ion as central metal ion.

8. A process according to claim 1, wherein the anionic surfactant is added after the final synthesis step.

9. A process according to claim 1, wherein the membrane separation process consists of a hyperfiltration which is carried out under a pressure of 10 to 100 bar.

10. A process according to claim 1, which comprises the use of an asymmetrical membrane which is modified by polyfunctional compounds containing ionic groups and the basic skeleton of which consists of cellulose acetate, polyacrylonitrile or a copolymer of acrylonitrile and other ethylenically unsaturated monomers, and whose pores have a diameter of 0.1 to 50 nm.

11. A process according to claim 1, wherein the synthesis solution or suspension has a solids content of 5 to 15% before and 30 to 50% after the membrane separation process.

12. A process according to claim 1, wherein the concentrated dye solution or suspension of low salt content is converted into a solid formulation by drying, optionally after the addition of other ingredients.

13. A process according to claim 1, wherein the concentrated dye solution or suspension of low salt content is converted into a liquid formulation with a specific final concentration of dye by dilution and/or with the aid of extenders, optionally after the addition of other ingredients.

14. A solid or liquid metal complex dye formulation obtained by the process as claimed in claim 1.

15. A process of claim 9, wherein the pressure is in the range of 10 to 30 bar.

* * * * *

UNITED STATES PATENT AND TRADEMARK OFFICE
CERTIFICATE OF CORRECTION

PATENT NO. : 4,452,608
DATED : June 5, 1984
INVENTOR(S) : Paul Erzinger

It is certified that error appears in the above-identified patent and that said Letters Patent is hereby corrected as shown below:

Claim 1, Column 6, Line 11 should read--

30°C to 40°C immediately before the membrane separation --.

Signed and Sealed this

Third Day of September 1985

[SEAL]

Attest:

DONALD J. QUIGG

Attesting Officer    Acting Commissioner of Patents and Trademarks - Designate